United States Patent Office 3,207,901
Patented Sept. 21, 1965

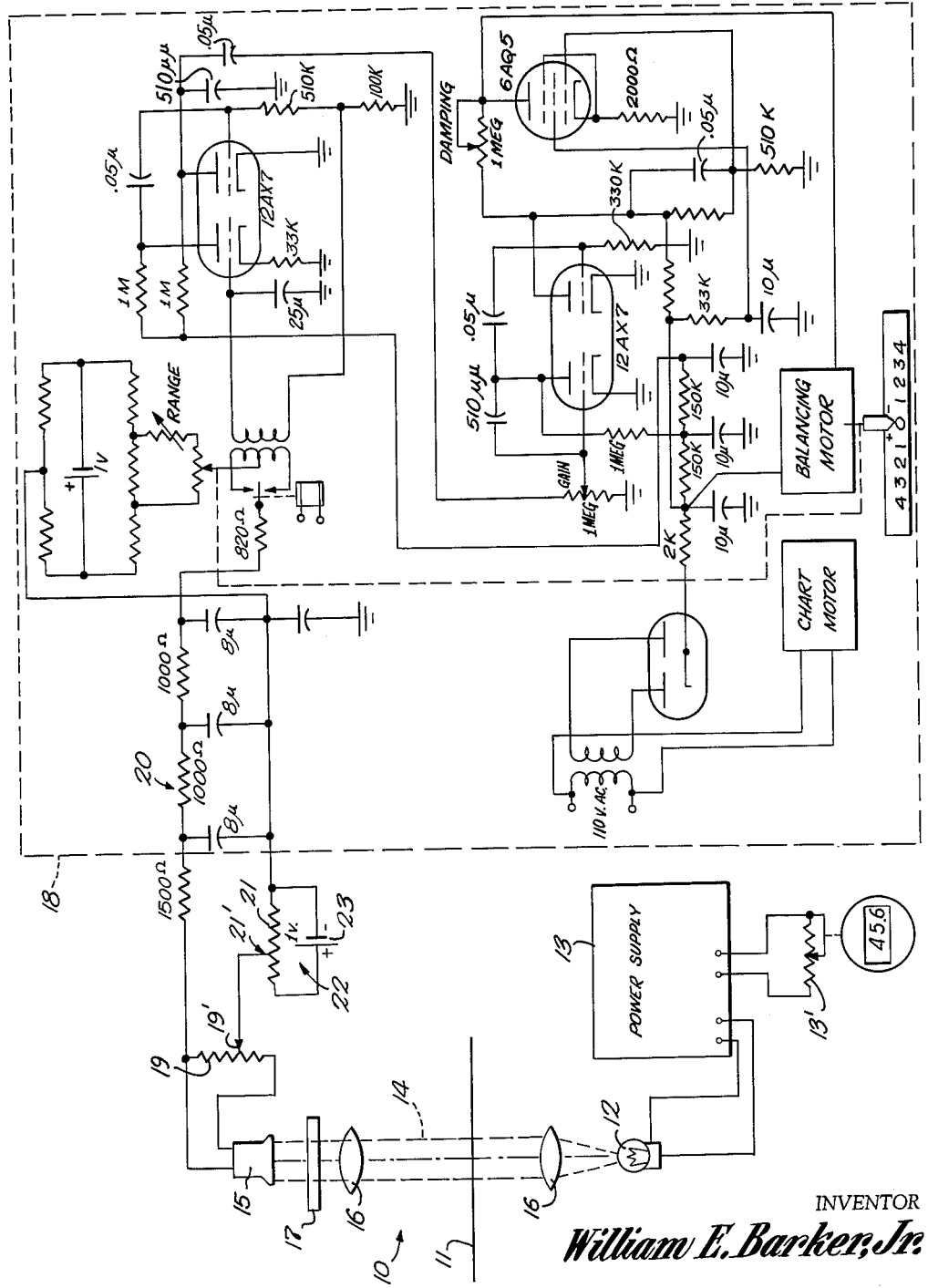
Sept. 21, 1965     W. E. BARKER, JR     3,207,901
APPARATUS FOR MEASURING BASIS WEIGHT OF PAPER AND THE LIKE
Filed July 30, 1962
INVENTOR
*William E. Barker, Jr.*
BY *Mason, Fenwick & Lawrence*
ATTORNEYS

3,207,901
APPARATUS FOR MEASURING BASIS WEIGHT
OF PAPER AND THE LIKE
William E. Barker, Jr., Orlando, Fla., assignor, by mesne assignments, to Brun Corporation, Columbus, Ohio
Filed July 30, 1962, Ser. No. 213,351
5 Claims. (Cl. 250—83.3)

The present invention relates in general to apparatus for measuring and recording qualities of paper during manufacture thereof, and more particularly, to apparatus for measuring and recording the basis weight of paper continuously during the manufacturing process.

The basis weight of paper, expressed in pounds, is the weight of a ream of 480 and/or 500 sheets of size 24 inches by 36 inches. Because of inherent imperfections in the manufacturing process, the paper industry has for years been plagued by variations in basis weight across the sheet during manufacture. Such variations have been determined by a necessarily tedious and imprecise procedure, which has customarily involved the procedure of tearing off samples of the paper along the width of the paper web at the end of a roll. These samples are then subjected to laboratory type testing at a separate location to measure basis weight. The corrections then determined as desirable may be made on succeeding rolls. Obviously, such a procedure does not permit instantaneous and continuous correction.

An object of the present invention is the provision of novel apparatus for measuring and recording basis weight of paper continuously as the paper sheet is being produced to detect promptly any variations in basis weight from a selected value and provide signals which may be employed to sound an alarm or automatically control the paper machine to correct the error.

Another object of the present invention is the provision of novel apparatus for continuously monitoring the basis weight of paper during the production of the paper sheet in a manner providing a non-contact, non-destructive measurement to indicate instantly the existence of any error in the basis weight and extent of the error.

Another object of the present invention is the provision of novel apparatus for measuring the basis weight of paper continuously as the paper is being produced by scanning a radiant energy beam of selected wave length span across the width of the paper and detecting such radiation emerging from the paper in a manner permitting a continuous record of the basis weight.

Another object of the present invention is the provision of novel apparatus for measuring the basis weight of paper continuously as the paper is being produced by scanning a radiant energy beam of selected wave length span across the width of the paper and detecting such radiation emerging from the paper in a manner to continuously sense and record the basis weight of the paper in such a way as to preclude a moisture error.

Other objects, advantages and capabilities of the present invention will become apparent from the following detailed description, taken in conjunction with the accompanying drawing illustrating the preferred embodiment of the invention.

In the drawing, the figure is a schematic diagram of apparatus for measuring or continuously monitoring variations in the basis weight of paper embodying the present invention.

The apparatus of the present invention in general comprises a paper sensing unit which may either remain fixed with respect to the edge of the paper or be swept transversely back and forth across the sheet, the sensing means including a source of radiant energy for passing through the paper sheet radiant energy of a particular defined wave length span, a photoemissive detector for quantitatively responding to the radiant energy transmitted by the sheet, and a meter for measuring the D.C. voltage output of the detector in terms of variations of the basis weight of paper. Due to the selection of a particular range of wavelengths of radiation, the moisture content will not cause any error in the reading whether the paper be soaking wet or bone dry or have a moisture condition between these limits, so that an accurate and instantaneous sensing of any variations which may occur in basis weight is made available.

Referring to the embodiment shown in FIGURE 1, the apparatus for measuring the basis weight of the paper as it is being produced comprises a detector or sensing unit, generally designated by the reference character 10, disposed at a suitable location relative to paper 11 emerging from a paper making machine, for example, adjacent to a stack of calendar rolls, to continuously monitor the paper sheet being produced. The detector unit 10 includes a radiant energy emitter or source 12 such as an incandescent lamp of the automotive type having high thermal inertia. Current for the lamp 12 is supplied from a well-regulated power supply 13 to provide substantially constant light intensity. As manufactured, the paper sheet 11 moves past the radiant energy beam indicated at 14 in a horizontal direction as viewed in FIGURE 1. Radiant energy transmitted through the paper is seen by a detector 15, having first passed through a lens or lenses 16 and a filter 17. The filter 17 is selected to pass only that wavelength span in the near infra-red not affected by moisture in the paper as more specifically set out hereinafter. The detector 15 of photoemissive type, preferably most sensitive at the wavelength of measurement, puts out a voltage which is proportional to the basis weight and which is read on a meter or recorder, as desired. A suitable recorder of the zero center strip chart type is schematically indicated at 18.

In the particular embodiment shown, the current generated by the photoemissive detector 15 is applied across a load resistor 19 of the potentiometer type. The upper end of the load resistor 19 is connected to the input filter network 20 of the recorder 18 and the wiper arm 19' is connected to the wiper 21' of a potentiometer 21 in a balancing network 22 including a small battery 23, for example of one volt rating, connected across the potentiometer 21. The function of the balancing network 22 is to apply a balancing voltage across the portion of the load resistor 19 to which the recorder is connected to set the recorder pointer to the zero position when a specimen sheet of known basis weight is interposed in the radiant energy beam. The power supply unit 13 includes a control potentiometer 13' to permit manual adjustment of the level of energization of the radiant energy source 12 for sheets of different basis weight, a suitable indicator being provided to permit calibration of the power supply potentiometer settings in terms of basis weight. The pointer or stylus of the recorder 18 herein shown therefore scribes out an indication of deviations of basis weight of the paper from the basis weight value determined by setting of the power supply potentiometer.

It will be appreciated that the proper choice of a filter is most important because of the necessity for measuring at a point on the spectrophotometric absorption curve where radiation affecting factors which do not vary in proportion to basis weight will not distort the emergent radiation from the paper, so that only changes in basis weight will be sensed. Specifically the basis weight must be measured within wavelength ranges where energy conversions due to electronic, atomic or molecular changes induced by the radiation energy do not occur to any appreciable degree. The following wavelength ranges (in microns) have been found satisfactory; 0.7 to 0.92; 0.96 to 1.0; 1.2 to 1.3; 1.6 to 1.8 and 2.0 to 2.4. Stated negatively, the basis weight must be measured in the range 0.7 to 2.5 microns, but not at the following wavelengths where energy absorption due to moisture have been found to occur: $0.94\mu$, $1.1\mu$, $1.45\mu$, $1.91\mu$ and $2.5\mu$.

The wavelength range must be below $2.5\mu$, to avoid absorption bands produced by possible atomic displacement or oscillation within the molecules of ingredients of the paper. In the visible wavelength range of about 0.4 to 0.7 micron, interference from color in the paper is encountered, and below 0.4 microns, the electron resonance response is too great, thus rendering these wavelength ranges unsuitable for the measurements desired. It will be further appreciated that within the stated ranges the apparatus measures primarily scatter caused by the fibers of the paper and secondarily non-resonant absorption by the paper.

In a practical working embodiment, a filter such as a Corning Glass Company filter Number 7–69, whose wavelength of maximum transmission is $0.9\mu$ and whose half-band width is $0.25\mu$ ($0.75\mu$ to $1.0\mu$) has been found satisfactory when used with a silicon photovoltaic cell manufactured by International Rectifier Corp. under the designation IRC S1020 E 6 PL-K4, whose wavelength of maximum sensitivity is $0.82\mu$ and whose half-band width is $0.5\mu$ ($0.5\mu$ to 1.0 ). A satisfactory radiant energy source used with this combination is a General Electric Company sealed beam lamp Number 6.6A/PAR 56/3 rated at 200 watts and 6.6 amps., across which, during operation, is impressed a maximum voltage of eleven volts. With this combination, insertion of fifty-seven pound paper into the beam required 8.0 volts at 3.3 amps. through the radiant energy source for the recorder to be nulled.

While but one specific embodiment of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for testing the basis weight of a moving sheet of paper after it has been formed comprising radiant energy sensing means responsive to a beam of radiant energy of selected wavelength range for producing a variable current representative of basis weight variations of the paper, a radiant energy source for projecting a beam of radiant energy including said selected wavelength range through said sheet of paper onto said sensing means, indicating means responsive to the current variations produced by said sensing means for producing an indication of the basis weight variations of the sheet of paper, and means for restricting the wavelength range of the beam of energy to which said sensing means responds to wavelength ranges lying within the near infrared having no substantial wavelength components where energy absorption due to moisture occurs.

2. Apparatus for testing the basis weight of a moving sheet of paper after it has been formed comprising radiant energy sensing means responsive to a beam of radiant energy of selected wavelength range for producing a variable current representative of basis weight variations of the paper, a radiant energy source for projecting a beam of radiant energy including said selected wavelength range through said sheet of paper onto said sensing means, indicating means responsive to the current variations produced by said sensing means for producing an indication of the basis weight variations of the sheet of paper, and means for restricting the wavelength range of the beam of energy to which said sensing means responds to wavelengths within the range of 0.7 micron to 2.5 microns but substantially omitting the wavelengths of the moisture absorption bands.

3. Apparatus for testing the basis weight of a moving sheet of paper after it has been formed comprising radiant energy sensing means responsive to a beam of radiant energy of selected wavelength range for producing a variable current representative of basis weight variations of the paper, a radiant energy source for projecting a beam of radiant energy including said selected wavelength range through said sheet of paper onto said sensing means, indicating means responsive to the current variations produced by said sensing means for producing an indication of the basis weight variations of the sheet of paper, and means for restricting the wavelength range of the beam of energy to which said sensing means responds to wavelengths within the range of 0.7 micron to 2.5 microns but substantially omitting 0.94 micron, 1.1 microns, 1.45 microns, 1.91 microns and 2.5 microns.

4. Apparatus for continuously measuring variations in basis weight of a moving sheet of paper during the manufacture thereof comprising photoemissive means located alongside one side of the moving paper sheet as it emerges from a paper processing machine for producing a variable current responsive to variations in a radiant energy beam emerging from the paper representing basis weight variations in the paper, means for projecting a beam of radiant energy through said sheet of paper from a side opposite said first-mentioned side and directing the beam onto said photoemissive means, means for restricting the wavelength of the beam of radiant energy emerging from the paper sheet to which the sensing means is exposed to a wavelength band lying within the range of 0.7 micron to 2.5 microns but substantially omitting wavelengths within said range at which moisture absorption bands occur to render the current variations produced by said photoemissive means substantially unaffected by variations in the moisture content of the sheet of paper, and indicating means responsive to the current variations produced by said photoemissive means for producing an indication of the basis weight variations of the paper.

5. In apparatus for continuously measuring variations in basis weight of a moving sheet of paper, the combination recited in claim 4 wherein said photoemissive means has a wavelength of maximum sensitivity of about 0.82 micron and a half-band width of about 0.5 micron and said means for restricting the wavelength of the beams in a filter having a wavelength of maximum transmission of about 0.9 micron and a half-band width of about 0.25 micron.

References Cited by the Examiner

UNITED STATES PATENTS

| | | | |
|---|---|---|---|
| 2,606,294 | 8/52 | Hagan | 250—219 |
| 3,026,413 | 3/62 | Taylor | 250—83.3 |
| 3,043,956 | 7/62 | Cohen | 250—83.3 |

RALPH G. NILSON, *Primary Examiner.*

JAMES W. LAWRENCE, *Examiner.*